United States Patent
De Abreu

(10) Patent No.: US 7,501,788 B2
(45) Date of Patent: Mar. 10, 2009

(54) QUANTUM GENERATOR AND RELATED DEVICES OF ENERGY EXTRACTION AND CONVERSION

(75) Inventor: Paulo Emmanuel De Abreu, Curitiba (BR)

(73) Assignee: Guacemmi Participacoes Societarias, Ltda., Curitiba (BR)

( * ) Notice: Subject to any disclaimer, the term of this patent is extended or adjusted under 35 U.S.C. 154(b) by 391 days.

(21) Appl. No.: 10/548,119

(22) PCT Filed: Mar. 5, 2004

(86) PCT No.: PCT/IB2004/050206

§ 371 (c)(1),
(2), (4) Date: Sep. 2, 2005

(87) PCT Pub. No.: WO2004/077921

PCT Pub. Date: Sep. 16, 2004

(65) Prior Publication Data

US 2006/0255991 A1    Nov. 16, 2006

(30) Foreign Application Priority Data

Mar. 6, 2003  (BR) .................................... 9705871
Feb. 2, 2004  (BR) .................................... 9705871
Feb. 17, 2004  (BR) .................................... 9705871

(51) Int. Cl.
*H01M 10/46* (2006.01)
(52) U.S. Cl. .................................................. 320/101
(58) Field of Classification Search ................ 320/101, 320/107, 112; 429/17, 19, 21, 24, 94, 96, 429/97, 98, 99, 100, 152, 160; 136/243, 136/291
See application file for complete search history.

(56) References Cited

U.S. PATENT DOCUMENTS

| 5,801,515 A | 9/1998 | Chen et al. |
| 6,294,893 B1 | 9/2001 | de Abreu |
| 6,477,028 B1 | 11/2002 | Pinto |
| 6,751,083 B1 | 6/2004 | Gleiter et al. |
| 2006/0232246 A1 | 10/2006 | De Abreu |

FOREIGN PATENT DOCUMENTS

| DE | 35 41 084 A | 8/1987 |
| EP | 0 644 604 A | 3/1995 |
| JP | 2001 023682 A | 1/2001 |
| WO | WO 97/32384 A | 9/1997 |

*Primary Examiner*—Edward Tso
(74) *Attorney, Agent, or Firm*—Lowrie, Lando & Anastasi, LLP

(57) ABSTRACT

This invention refers to the Quantum Generator and Accessories, as the first-mode quantum generator, as the second-mode quantum generator, as the radiant recharger for accumulators and as the radiant recharge process for accumulators. Besides individual peculiarity and importance, when integrated and associated they constitute the third-mode quantum generator that by zero point energy obtained through the interaction between light and material generates energy for any practical use. It integrates quantum capacitors formed by two porous lead plates between two accumulators that use the thermal potentials activated on the free electrons gas on the surface of tensioned metals, representing temperatures close to Zero Kelvin (273.15° C.), and on compressed metals, with temperatures close to two times the operational absolute temperature, representing preferentiality temperatures close to Zero Kelvin (−273.15° C.) and close to 600 Kelvin ( 326.85° C.).

1 Claim, 10 Drawing Sheets

QUANTUM GENERATOR AND RELATED DEVICES OF ENERGY EXTRACTION AND CONVERSION b 1. TECHNICAL FIELD

This invention refers to the Quantum Generator and Accessories, expressed as the first-mode quantum generator, as the second-mode quantum generator, as the radiant recharger for accumulators and as the radiant recharge process for accumulators. Besides individual peculiarity and importance, when integrated and associated they constitute the third-mode quantum generator for the generation of the zero point energy obtained through the interaction between light and material.

2. BACKGROUND ART

The purpose of energy generators is to maintain a defined electromechanical force between either terminals of an electric charge or any electromechanical device to move, heat, illuminate, resonate or to supply energy for any human intention, including the process of charge and discharge of accumulators through energy transformation.

The methods for charging accumulators are well known. The most conventional consists of applying direct current through the accumulators. Besides simple, this method can cause increase of the temperature and excess of gases, requiring a long period for the total recharge of the accumulator.

This charging period could be reduced by applying discharging pulses between charging pulses, as described on U.S. Pat. No. 3,597,673 by BURKETT et al.

An even greater reduction on the charging period could be obtained interspacing a specific rest period between the discharge pulse and the recharge pulse as described on U.S. Pat. No. 4,829,225 by PODRAZHANSKY et al. The same inventor has improved this patent through the application of charging pulses in direct current separated by specifics rest periods after the recharge, followed by multiple depolarizing pulses complemented by respective rest periods after these multiple discharge pulses, as described on PCT/US 96/11466. While on patent application WO 00/76050, this inventor discloses a battery charger with enhanced charging and charge measurement processes with a bipolar waveform, which can be in the form of sine waves, or other wave shapes. The charge pulse is preferably followed by a small technical rest period, after which a discharge pulse is applied, followed, in turn, by a rest period. The bipolar waveform is superimposed on one or more of the above. A second discharge pulse is then applied followed by another rest period. A second bipolar waveform is superimposed on either the second discharge pulse or the second rest period. The second bipolar waveform allows a measurement of the battery capacitance to be obtained and an evaluation of the charge of the battery to be derived. The charge cycle is repeated until a measured battery parameter attains a desired value indicative of a charged battery.

On patent U.S. Pat. No. 6,388,425, PETROVIC presents a waveform with long period recharging pulses of approximately 60 to 180 seconds, separated by two rest periods interspersed by a discharge period of 10 to 20 seconds.

GLEITER et al (Charge-Induced Reversible Strain in a Metal, Science Magazine, Apr. 11, 2003, Vol. 300, p. 312-315) describes that reversible strain amplitudes can be induced in metals by introducing electrical charges, mainly in metals with extremely high surface-to-volume ratio. On patent DE 19952447,5 (PCT/EP00/10079) GLEITER exposes that the aim of the invention is to produce a nanoporous metal device susceptible to several applications.

TIMOSHENKO, et al (Theory of Elastic Stability. New York: McGraw-Hill, Second Edition, 1963. p. 470-485) when relating experimental results on thin shells suffering reversible deformations, i.e., simultaneously placing under compression and under tension the symmetrical sides of metallic shells of high ratio between diameter and thickness (D/t) through bending tests, concludes that "The discrepancy between experiment and theory is larger for thinner shells". It was showed through graphics and formulas that different metallic alloys have the same critical curve when they have the same ratios of D/t and $E/\sigma_y$. Therefore, the critical curve for both brass and steel is the curve "545" given by the relation $E/\sigma_y=545$, as shown on FIG. 1. With the results found on axial-compression and bending tests on thin tubes of steel and brass, the author concludes that the values found for the critical stress are about 1.4 times those found in axial-compression tests for all values of diameter/thickness (D/t).

New energy sources have been searched as alternatives of the background art so far presented, such as the zero point energy (ZPE). PUTHOFF ("Can the Vacuum be Engineered for Space flight applications?", NASA Breakthrough Propulsion Physics Workshop, Aug. 12-14,1997, NASA Lewis Research Center, Cleveland, Ohio), recognizes that the "quantum vacuum is an enormous reservoir of untapped energy, with energy densities conservatively estimated by Feynman and others to be on the order of nuclear energy densities or greater". Therefore, the question posted by PUTHOFF is: "Can the ZPE be 'mined' for practical use?" Further, PUTHOFF mentions that several experimental formats for tapping the zero point energy for practical use are under investigation in his laboratory. For instance, one of the latest patent published yet that tries to use the zero point energy, U.S. Pat. No. 6,665,167 by PINTO, adopt the Casimir effect, that is mechanical forces to generate energy.

3. TECHNICAL PROBLEM

The solutions presented on the actual background of art have several disadvantages, due to the technical problems described below.

The several waveforms and respective charge and discharge pulses adopted on PODRAZHANSKY patents, by being considerate initially as depolarizing pulses and recharge pulses, and, recently considerate as bipolar waveform, drove him to keep for the recharge the usage of two poles conventional accumulators. This alternative does not allow obtaining better performance in the charge as well on the discharge of the accumulator. It also do not allows to generate energy.

The waveform adopted by PETROVIC with long runs of charge and discharge lasts approximately from 1 to 2.5 hours to recharge lead acid batteries. In the same way that PODRAZHANSKY keep for recharge the use of two poles conventional accumulators. However, it does not allow better efficiency in the charge as well as in the discharge of the accumulator. It also does not allow generating energy.

It is important to point out that despite GLEITER et al had verified on the Science Magazine article that the recharge and discharge of the spongeous electrode produces reversible elastic deformation on metals, they did not related it to battery or accumulator processes or to elastic mechanisms on metals of spongeous electrodes like on lead acid batteries. Furthermore on his patent, GLEITER adopted only one electrode, one permeable porous layer, one electrolyte and a means for applying voltage. So far, the use of only one electrode does not produces results for the energy generation from the zero point energy.

THIMOSHENKO, also does not show a solution for the technical problem of the discrepancy between experiment and theory for thinner shells, and does not find industrial applicability for the 40% increase of the critical stress of pure bending when compared to axial-compression found for all values of ratio of diameter and thickness (D/t). However, at a given temperature, the major problem is that the metals could not change intrinsic proprieties such as critical stress without the free electron gas causes a dimension deformation on the material or vice versa. Resuming, like other researchers he did not found a practical applicability to generate energy from the zero point energy.

The researches and patents related and published by PUTHOFF, also do not show industrial applicability desired for the use of zero point energy, what makes him concludes that "there still are unforeseen breakthroughs to be crossed over". For example, the PINTO patent does not allow larger zero point energy generation because the technological limitations to produce the required plates to use the Casimir effect in large scale. So far, as described it does not relate to battery processes.

Due to these related problems and other limitations, the energy generators available today have the disadvantage of only being able to transform usual energies. The hydroelectric and fossil fuel sources of energy have high costs and result in significant damage to the environment; the nuclear energy is a declining source because of the high cost of generation and extreme operational risks as can be observed as a result of catastrophes reported by the worldwide press in the past decades; the wind energy, the tidal energy, the solar cells and the fuel cells have high costs for the generation of guaranteed limitless energy.

So, the solutions described at the background art still have many technical problems not allowing the generation of energy from the zero point energy (ZPE). All available accumulators are basically energy consumers because the process of charge and discharge are irreversible, i.e., they actually are energy dissipaters. Besides that, the toxic waste generated due to the limited lifetime of battery and accumulators cause huge environmental problems.

4. TECHNICAL SOLUTION

The present invention discloses the Quantum Generator and Accessories to solve the related technical problems, by means of a constructive arrangement of metallic reservoirs with high ratios between the surface area to the mass of the metal which are submitted to tension and compression processes creating thermo potentials on the free electron gas through the interaction of light and material. This interaction generates the energy needed for practical use from the zero point energy.

The Quantum Generator and Accessories are firstly represented by an elementary arrangement named first-mode quantum generator. It is constituted by an external under tension metallic shell, coupled to internal under compression metallic shell by bolts and nuts isolated by dielectrics, generating energy through a predominant photoelectric process.

The Quantum Generator and Accessories are shown in a more improved way as the second-mode quantum generator, as the radiant recharger for accumulators and as the radiant recharge process for accumulators, which all of them overcome the background art. These new constructive arrangements allow to generate energy between two batteries on the discharge or recharge, during halftime of a complete cycle of the new processes that basically consist in submitting one metallic electrode from one of the batteries to a tensioned or compressed state in one step, while the metallic electrode from the other battery is submitted to a compression or tension state in the same step. In the following step the electrodes under tension and under compression are both interconnected.

In addition, the radiant recharge process allows a more efficient recharge with great enhance of the lifetime even for two poles conventional batteries.

The third-mode quantum generator represents the best mode of the invention. This new arrangement was developed in order to integrate quantum capacitors formed each one by at least two spongiform (or porous) lead plates between two accumulators, by means of a new process operating in the variation of the electron gas thermo potentials from zero Kelvin (−273.15° C.) to two times the absolute operation temperature, preferentially close to Zero Kelvin (−273.15° C.) and close to 600 Kelvin (326.85° C.), in the whole cycle.

The third-mode quantum generator associates only the generation steps adopted on the second-mode generator, as well as on the radiant recharger for accumulators, generating energy in each of the four steps of the cycle, allowing an impressive performance increase.

In order that a technician may easily reproduce the present invention on the several described arrangements with adequate operational performance, it is necessary to consider all the aspects and parameters of the Quantum Generator and Accessories.

First of all, it is essential to consider at an ambient temperature of 300K (26.85° C.), metals under tension increase in volume and metals under compression reduce in volume in accordance with:

| Symbol | Description |
|--------|-------------|
| P | Applied load |
| A | Cross sectional area (before loading) |
| l | Length (before loading) |
| E | Modulus of elasticity |
| ν | Poisson's Ratio |
| $\sigma_y$ | Yield Stress = P/A |
| $\epsilon$ | Unit longitudinal strain = $\sigma_y/E$ |

Therefore each cubic meter of volume increases to $(1-2\nu\epsilon+\epsilon)$ cubic meters under tension and decreases to $(1+2\nu\epsilon-\epsilon)$ under compression.

On the other side, metal under compression increases both free electron concentration in space as well as its Fermi energy, and metal under tension decreases both free electron concentration in space as well as its Fermi energy in accordance to the expression:

$$E_F = \frac{h^2}{2m}\left(\frac{3n}{8\pi}\right)^{\frac{2}{3}}$$

Where:

| Symbol | Description |
|--------|-------------|
| $E_F$ | Fermi's Energy |
| h | Planck's Constant |

-continued

| Symbol | Description |
| --- | --- |
| m | Electron Mass |
| n | Free electrons Concentration |

The Fermi Energy increases with the increase of free electron concentration in space, due to the fact that electrons fill the available energy states in a way that there are two electrons by state according to the Pauli exclusion principle, until the Fermi Energy level is reached.

In accordance to the Fermi-Dirac distribution f (U), as shown on the graphic of FIG. 2, the probability of finding an electron at a given state of energy U is calculate by the expression:

$$f(U) = \frac{1}{e^{(U-E_F)/kT} + 1}$$

In accordance with the graph of f (U) versus the state of energy U at any given temperature T>0 K, when U is equal to $E_F$, the probability of finding an electron f (U) is 50%, as shown in FIG. 2.

The most significant variations in the Fermi-Dirac distribution occurs around the high Fermi Energy and are caused by temperature or by the unit longitudinal strain created on the material under tension or under compression.

FIG. 2 demonstrates that just a small fraction of states with energy levels above Fermi Energy is occupied while the same small fraction with energy levels below Fermi Energy is unoccupied.

The controlled excitation of this fraction of energy levels slightly above the Fermi Energy is obtained through compression of one of the shells, coupled with the excitation of the same fraction of electrons with levels of energy slightly below Fermi Energy obtained through tension of the other shell, increased by the high diameter-to-thickness ratio. It allows the reordering of the excitation states such that the probability f (U) for U=$E_F$, raises from 50% on each shell to f(EF+ΔEF) in one of the shells and f ($E_F$−Δ$E_F$) in the other one. The ideal is to obtain f($E_F$+Δ$E_F$) equal to zero and f ($E_F$−Δ$E_F$) equal 100% which would result in the total reorientation of the free electrons gas of the metallic shells.

Taking account that Quantum Physics shows the exact fraction of excited electrons with levels of energy slightly above and below Fermi Energy is calculated by 9KT/16$E_F$, experimentally was verified that the unit longitudinal strain could be written as $\epsilon=\Delta\lambda/\lambda=\sigma_t/E=9kT/32\,E_F$. Since the total energy of deformation of the shell is given by U=Pλε/2=λAσ²/2E, and that the compression stress $\sigma_C$ applied is equal to the tension stress $\sigma_t$, therefore $\sigma_C=\sigma_t=\sigma$. As the energies are proportional to the squares of the respective stresses, we have $\sigma_{critic}^2 = \sigma_{compresion}^2 + \sigma_{tension}^2$, and that $\sigma_{critic}^2 = 2.\sigma^2$ of where $\sigma_{critic}=\sigma\sqrt{2}$, which means $\sigma_{critic}=1,414\sigma$.

In second place, it is necessary to consider the photoelectric effect in a bigger spectral band. The energy E of the package or photon is related with its frequency ν in accordance with the equation: E=hν. In the photoelectric process a photon is completely absorbed by an electron in the photo cathode. When an electron is emitted from the surface of the metal, its kinetic energy K is given by K=hν−ω, where hν is the energy of the absorbed incident photon, and ω is equal to the work necessary to remove the electron from the metal.

The work (ω) must be expended to overcome the attractive fields of the surface atoms and the losses of the kinetic energy due to internal electron collisions. Some electrons are more strongly bonded than others; some lose energy due to collisions on its trajectory. In the case of a weaker bond and no internal loses, the photoelectron will emerge with the maximum kinetic energy $K_{MAX}$=hν−$\omega_o$ where $\omega_o$ is the characteristic energy of metals called work function. It is the minimum energy necessary for an electron cross the metal surface and escape the attractive forces that normally bind the electron to the metal in the absence of mechanical stress. Therefore hν₀ω₀, and as $K_{MAX}$=e$V_o$, we have that e$V_o$=hν−$\omega_o$.

The graph shown in FIG. 3 shows the results of the measurements of the kinetic energy of sodium at several frequencies. The threshold of the frequencies without mechanical excitation is 4.39×10¹⁴ Hz.

Up to now, an electron in a metal has been treated as a particle in a box. Implicitly we consider that electrons do not escape metal because the "box of energy" has very high walls. However, experience shows that electrons can escape metals as in the photoelectric effect, in thermo-ionic emissions, etc and through the inventive act of this patent, where the invention modified the potential energy function of a metal in a natural state to a function of potential energy of a metal which is excited through mechanical stresses associated with the surface area expressly enlarged through the use of adequate geometries and technologies, as disclosed in this patent.

For electrons within a metal, the energy function is approximately constant. Near the surface of the metal, the energy grows quickly and reaches its maximum constant value outside the metal boundary. If we assign a value of zero as the potential energy of an electron outside the metal, then −$V_o$ will represent the depth of the well of resultant potential as shown the graph of FIG. 4A.

We can determine $V_o$ from photoelectric experiences specifically, as shown in graph of FIG. 3, due to the fact that there exists a cutoff frequency $\nu_o$ below which, photons cannot eject electrons of a metal in a natural state, that is, free of stress in the elastic region.

This suggests that the more energetic electrons on the surface of a metal are at the threshold level of energy h$\nu_o$ below of the top of the potential well. The fact that photocurrent grows quickly when the energy of the photon rises above of the threshold value, demonstrates an abrupt growth in the number of electrons with less kinetic energy than within the metal. This corresponds precisely with the Fermi-Dirac distribution function. The more energetic electrons have a kinetic energy of $E_F$ and many other electrons have slightly less energy.

Technologies are shown in this patent, which obtain a substantial quantity of more energetic electrons that are on the surface of a metal with energies less than h$\nu_o$ below of the top of the potential well, by being excited to the energy above $E_F$.

At T=0K (−273.15° C.), all states are populated at an energy level $E_F$ above the bottom of the well, with the more energetic state having a total energy −h$\nu_o$, that is, −e$V_o$+$E_F$=−h$\nu_o$.

As e$V_o$=$E_F$+$\omega_o$, added to the fact of that at a temperature of 300K (26.85° C.), some portion of the excited electrons have an energy of Δ$E_F$ slightly above of $E_F$ that can be achieved through stress of the elastic region. Given that e$V_o$=$E_F$+Δ$E_F$+$\omega_o$, it is possible to modify the form of the potential function of metals free of stress which has already been established in the photoelectric effect as shown in the graph of FIG. 4A, to the potential function of metals under stress created through mechanical forces in accordance with the graph of FIG. 4B.

By governing the process where the fraction of excited electrons at levels of energy slightly above and below Fermi Energy with the following proprieties and technical parameters that should be considered at this operation: (a) temperature; (b) metal valence; (c) elastic stress metal state; (d) yield-point to modulus of elasticity ratio of metals $\sigma_y/E$; (e) diameter-to-thickness ratio $D/t$; (f) surface area; (g) increase of 41.4% of the critical compressive or tensile stresses in two coupled metallic shells; therefore, with the first-mode quantum generator was found a technical solution and industrial applicability for the resistance increase of metallic shells related by TIMOSHENKO, through the inter-relationship of the thermal, photonic, elastic and electrical energies, for the generation of the Zero Point Energy—ZPE.

From this, we have an equivalent effect of zero Kelvin (−273.15° C.) with the tension stress caused by the first-mode generator, affecting only the mass of the electronic gas. Thus, it is more efficient than conventional industrial processes of the background art where all the metal atomic parts are cooled. However, even using less metal mass, more expressive results are found in second-mode and third-mode quantum generators with the use of spongeous electrodes.

To illustrate and facilitate understanding, it will be determinate the elastic (mechanical), thermal and electrical energies associated to reservoirs of free electrons with high surface area-to-mass ratio. For practicality, the free electron reservoir chosen as an illustrative example was a spongeous lead plate because of numerous characteristics: it is easy to obtain and to handle, its properties are easily found in a vast body of literature and also this metal is particularly interesting because of its extremely high relation between the contact area and the active mass of the pure metal. Some characteristics of the porous lead plate and micro-crystals are:

| Description | Value | Symbol |
|---|---|---|
| Dimensions of the plate | 0.120 m × 0.140 m × 0.002 m | |
| Yield strength | $12.7 \times 10^6$ Pa | $\sigma_y$ |
| Modulus of elasticity | $17.4 \times 10^9$ Pa | E |
| Mass of pure lead | $8.7 \times 10^{-2}$ kg | m |
| Mol of lead | 207.21 | M |
| Density of lead | $11.34 \times 10^3$ kg/m³ | $\rho$ |
| Volume of lead | $7.67 \times 10^{-6}$ m³ | $V = m/\rho$ |
| Specific heat of lead | 128 J/kg° C. | c |

Determination of the mechanical energy (EM) of a porous lead plate, in order to submit it to the limit of the elastic region: $E_M = \frac{1}{2}\sigma_y^2 V/E = \frac{1}{2}(12.7\times10^6)^2 \ (7.67\times10^{-6})/(17.4\times 10^9) = 3.55\times10^{-2}$ J.

The thermal energy to heat the mass of the free electron gas from the porous lead plate ($m_G$) from a temperature of 0K (−273.15° C.) to 300K (26.85° C.) is approximately $E_T = 1.77\times10^{-2}$ J, according to: $m_G = (87/207.2) \ (6.02\times10^{23}) \ (9.11\times10^{-31}) \ (2) = 4.61\times10^{-7}$ kg; e, $E_T = (4.61\times10^{-7})(128) \ (300) = 1.77\times10^{-2}$ J. So, it is equal to half of the value of the mechanical energy ($E_M$)

So, the porous lead was chosen, because in addition of being easier to check that the unit longitudinal strain ($\epsilon$) is equal the half of the value of the fraction of excited electrons with energy slightly above and below $E_F$, less energy is used to orient the electron gas of porous lead due to the low yield point.

Determination of the electrical energy ($E_E$) of a porous lead plate in an acid solution: considering the value of energy of a capacitor formed by a negative plate with dimensions 0.120 m×0.140 m×0.002 m in an aqueous 1250 kg/m³ solution of $H_2SO_4$ at a temperature of 300K (26.85° C.), the capacitance is determined experimentally to be 0.29 F. This is the capacitive effect of the electron gas. It is important to emphasize that we are considering Quantum Capacitor that is also the object of the referenced patent because there is no classical capacitor with a dielectric that is a good conductor as an electrolyte solution with strong acid.

The capacitance value above can be obtained from the discharge curve between two negative porous lead plates inside the same cell with a half-life time of 0.400 s using a resistive charge of 2Ω between the two plates and using a digital oscilloscope in real time. The measurements can be confirmed with approximate results through the equation: $C = AC_{AVe}/E_{Pb}$, where:

| Value | Description |
|---|---|
| $A = 2 \times 0.12 \times 0.14 = 3.36 \times 10^{-2}$ m² | Surface area of the plate faces |
| $C_A = 9.5 \times 10^{18}$ atoms/m² | Atomic density of plain Pb (111) |
| v = 2 | Valence of Pb |
| $e = 1.60 \times 10^{-19}$ C | Electron charge |
| $E_{Pb} = 0.35$ V | Electrode Potential of Pb |

According to the above equation, the capacitance from the effect of the gas of free electrons is 0.29 F, confirming with good proximity the value obtained experimentally. Therefore, the electrical energy $E_E$ confirmed in theory as well as through experiments is given as: $E_E = \frac{1}{2}C \ E_{Pb}^2 = \frac{1}{2}(0.29)(0.35)^2 = 1.78\times10^{-2}$ J.

Therefore, the electrical and thermal energy are equal, representing each fifty percent of the mechanical energy. This point is very important in order to optimize the mass of spongiform electrodes.

Thus, the discharge of the projected surface electrical charge of the porous lead electrode causes an equivalent effect of zero Kelvin (−273.15° C). This discharge affects the mass of electron gas faster, causing a more efficient process than the one adopted on the first-mode quantum generator. In this way, it makes possible the creation of the second-mode quantum generator, the radiant recharger for accumulators and the third-mode quantum generator.

5. ADVANTAGEOUS EFFECTS

The Quantum Generator and Accessories of this patent uses natural energy available anywhere we live with attractive advantages of low cost, no adverse environmental impact, and no risk of harm to people, plants or animals by achieving a bi-orientation of the free electron gas of metals, which constitute a limitless supply of energy.

There are many advantages when compared with the background art because no mentioned inventor nor described or claimed any product as a result of the inter-relationship of the several energy forms as adopted in the inventive act of the Quantum Generator and Accessories. This inter-relationship has a tremendous impact and applicability with technical, economic and environmental advantages, by the following effects, among others.

The depolarizing pulses adopted as discharge pulses by several mentioned inventors does not allow achieving the correct recharge parameters, even on conventional accumulators. The present patent allows adopting the correct discharge pulses as mechanical tension pulses controlled through the discharge of the electrical charge of the electrode-projected surface. This discharge increases the dimensions of the lead crystal lattice allowing the correct electrical charge to be recharged on the volume variation of the crystal lattice. This volume variation of the electrode crystal lattice is obtained between the tensioned state on discharge and the compressed state reached at the end of the recharge pulse. This method allows the advantage of faster and more efficient recharge process even on conventional accumulators using more practical systems.

While normal recharge systems are applied for just one accumulator as related in all the mentioned documents, the Quantum Generator and Accessories adopts several spongeous lead electrodes in more than one electrolyte environment what requires at least two accumulators. These two accumulators allows the bi-orientation of the free electron gas and is used as a radiant recharger of accumulators in one orientation, and in the other orientation is used as the second-mode quantum generator. The third-mode quantum generator has the great advantage of integrating both mentioned orientations (bi-orientation) to generate energy during the whole cycle.

The environmental advantageous effects obtained on the present invention are very important. It allows enhancing at least four times the lifetime of existing batteries reducing, in the same way, four times the toxic waste. There is also the possibility of using scraped batteries, increasing even more its importance for the environment.

With this invention the elastic metal energy is also used to generate the energy needed for practical use from the zero point energy on the discharge and recharge of batteries with the advantage of a higher efficiency with less material consumption.

Further, several advantageous effects are obtained.

Portable and stationary quantum energy generators dispense with the need for transmission lines that are vulnerable to bad weather, expensive and cause environmental problems.

Quantum generators are virtually maintenance free with a long lifetime due to the low noise and no mechanical vibrations.

Quantum generators can be used in any environment because they do not heat or cause odor.

Quantum generators require less material than any other energy system because they use a high-density energy source available everywhere, the zero point energy, with the same order of energy density as nuclear energy, or even larger.

To conclude, this technology could be easily spread, using recyclable material, plenty in the nature.

6. DESCRIPTION OF DRAWINGS

FIG. 1 is the graphic from page 470 from the book Theory of Elastic Stability (TIMOSHENKO, et al. New York: McGraw-Hill, Second edition, 1963), that due to the nature of the invention and for better understanding had the abscissas scale changed to the diameter-to-thickness ratio (D/t), showing that even different metallic alloys have the same critical curve when they have the same D/t and $E/\sigma_y$ ratios.

Figure 6A:
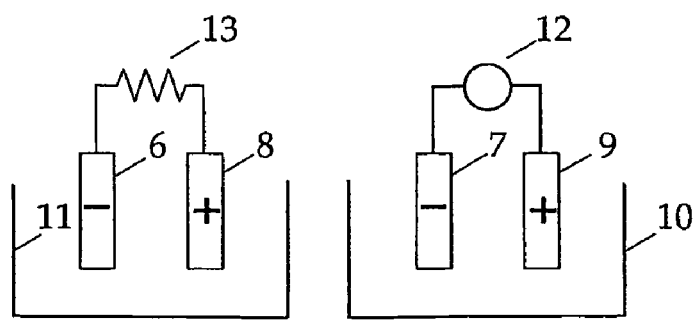
Figure 6B:
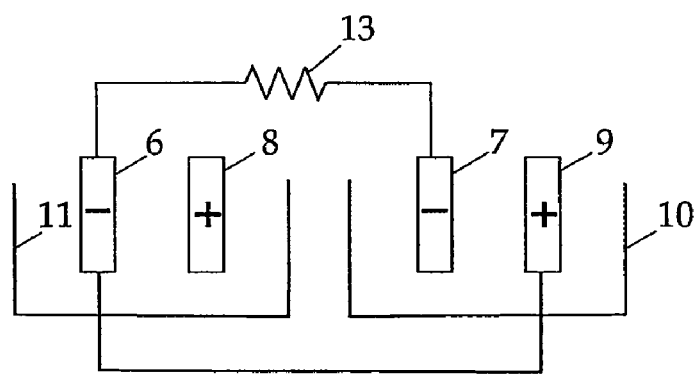
Figure 6C:
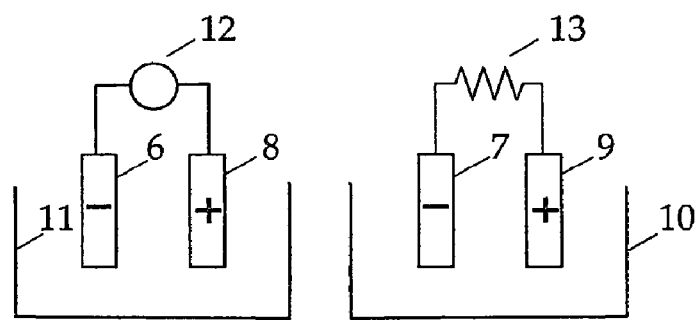

FIGS. 6A, 6B, 6C e 6D represent the arrangement of the second-mode quantum generator in each of the four steps of the cycle.

Figure 7A:
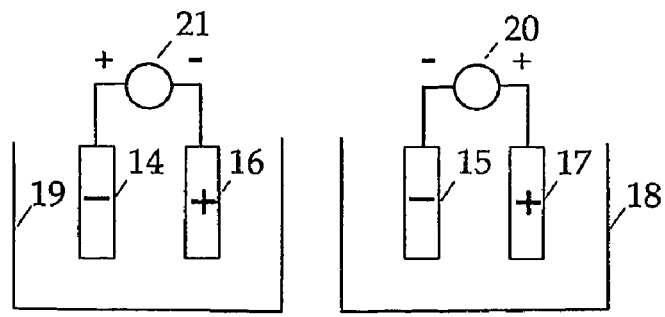
Figure 7B:
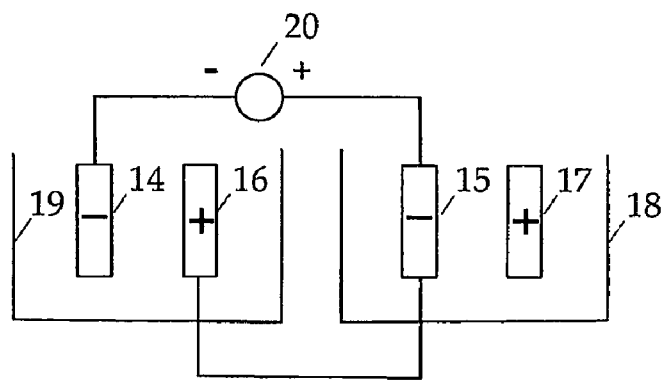
Figure 7C:
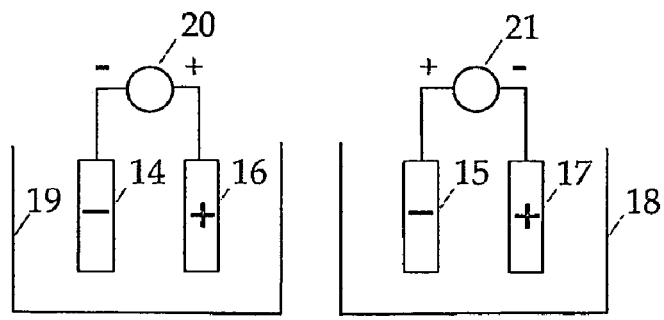

FIGS. 7A, 7B, 7C e 7D represent the arrangement of the radiant recharger in accumulators in each of the four steps of the cycle.

Figure 8:
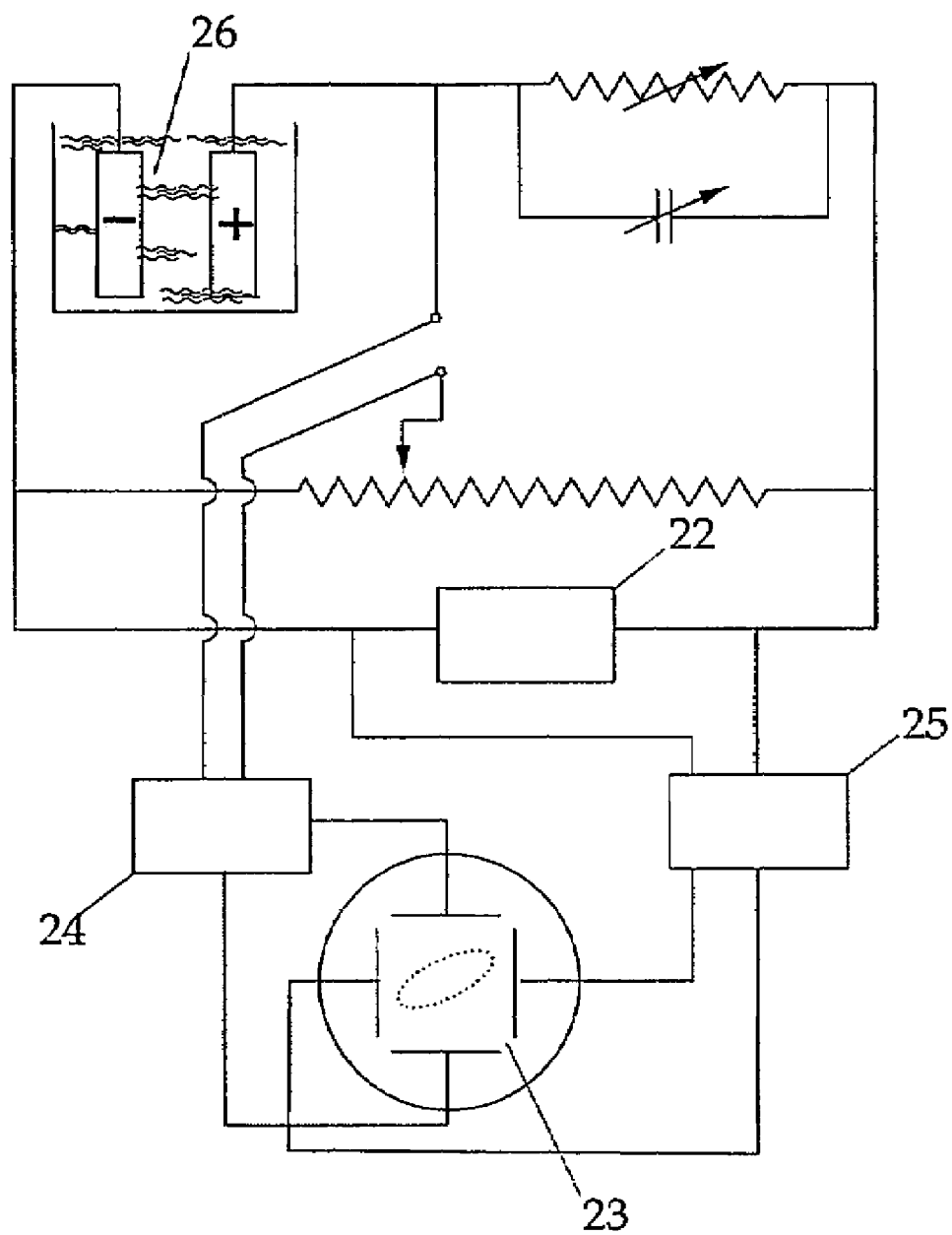

FIG. 8 shows the Wheatstone Bridge that due to the nature of the invention adopts pulsed current in order to establish the frequency both to transfer charge for the accumulator as to take charge out of the accumulator.

Figure 9A:
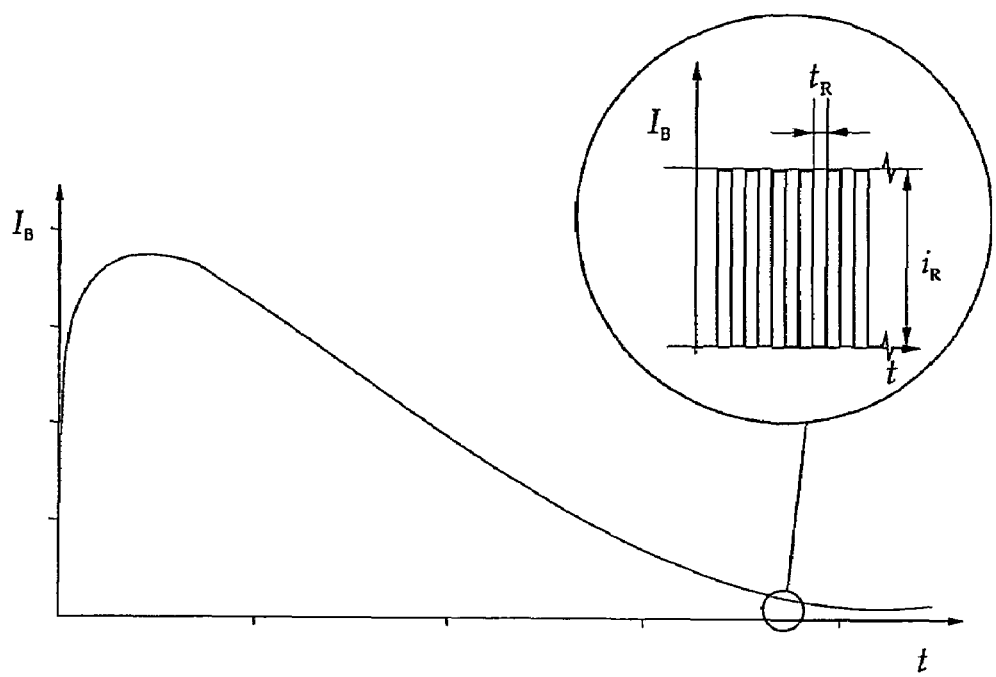

FIG. 9A represents the wrapper of the battery electric current amplitude due to the radiant recharge process on conventional accumulators, without discharge pulses.

Figure 9B:
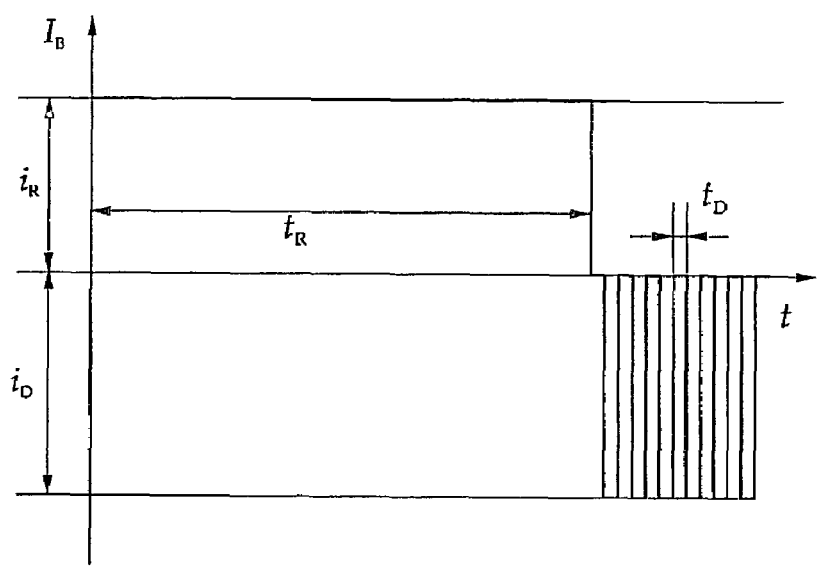

FIG. 9B represents battery electrical current waveform due to the time in the radiant recharge process in conventional accumulators with recharge pulses of direct current, followed by pulsed width modulated (PWM) discharge pulses.

Figure 10A:
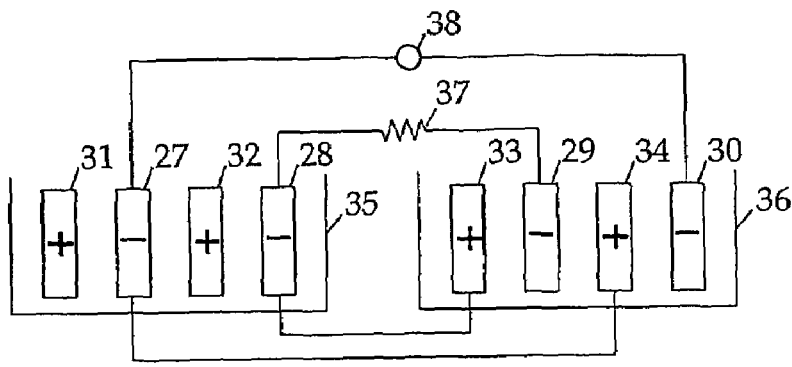
Figure 10B:
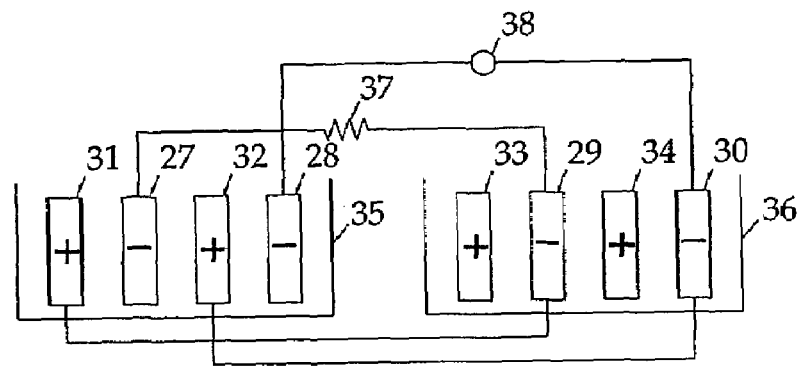
Figure 10C:
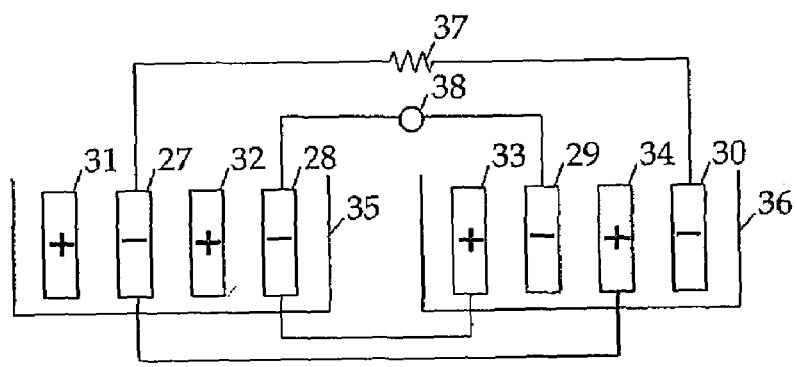

FIGS. 10A, 10B, 10C e 10D represent the third-mode quantum generator in each of the four steps of the cycle, where the discharge occurs in one instantaneous and the recharge occurs in other instantaneous of the same step.

7. BEST MODE

The Quantum Generator and Accessories best mode is the third-mode quantum generator, formed by the integration and association of the second-mode quantum generator, the radiant recharger in accumulators; one energy source and one reverse energy source; generating the zero point energy through the interaction between light and material for a practical use.

The Quantum Generator and Accessories best mode uses the thermal potentials generated on the free electrons gas of the surface of metals under tension, representing temperatures close to Zero Kelvin (−273.15° C.), and on compressed metals, with temperatures dose to two times the operational absolute temperature, representing preferentiality temperatures close to Zero Kelvin (−273.15° C.) and close to 600 Kelvin (326.85° C.), enhancing the generation of the Zero Point Energy—ZPE.

The Quantum Generator and Accessories best mode is developed in a way to integrate two quantum capacitors formed by two porous lead plates located inside two accumulators as shown on FIGS. 10A, 10B, 10C e 10D. It operates in all the four steps of the cycle as a quantum capacitor generating energy in all the four shown steps. In this way it overcomes the background art with the use of accumulators for a practical use of the zero point energy.

The Quantum Generator and Accessories best mode is applied on new designed accumulators with six poles, being two positive poles and four negatives poles.

8. MODE OF INVENTION

Figure 1:
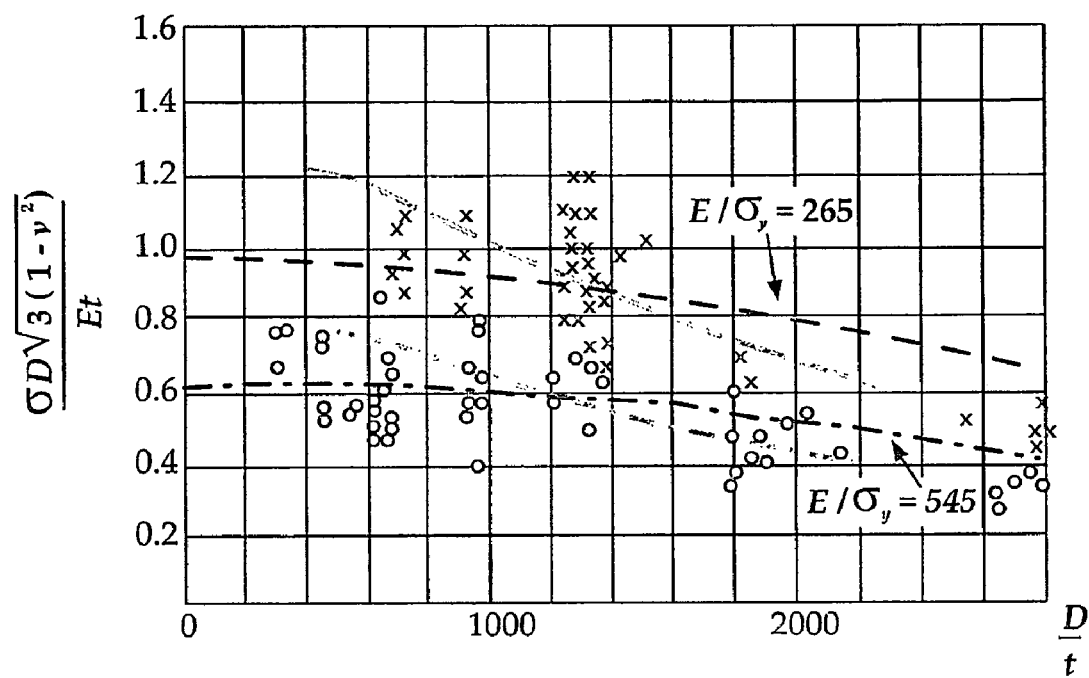
Figure 2:
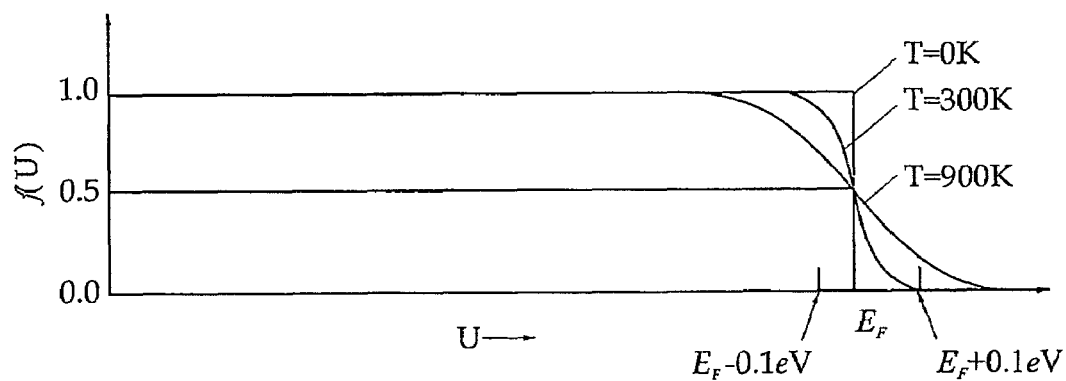
FIG. 2 is the Fermi-Dirac distribution function f(U) at Zero Kelvin (−273.15° C.) and others temperatures, showing the probability of finding an electron at a given state of energy U.
Figure 3:
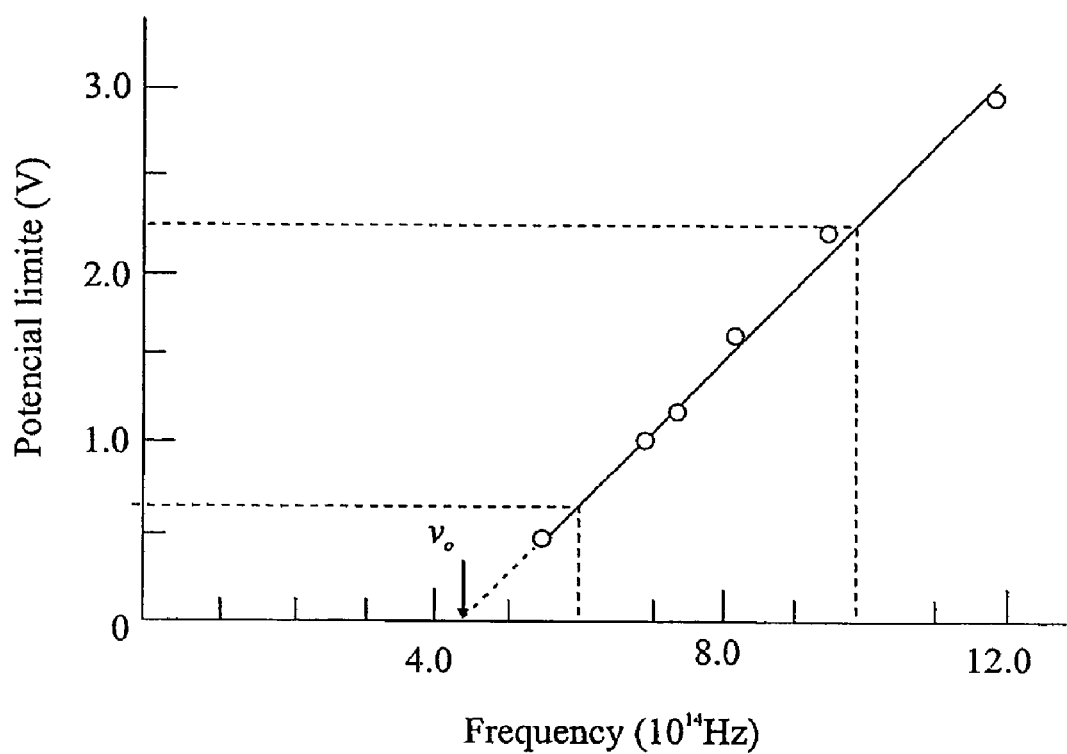
FIG. 3 represents the results of MILIKAN's measurements of the cut-off potentials due to the incidence of light over a sodium surface at several frequencies, taken from EISBERG et al (*Física Quântica—Quantun physic of atoms, molecules, solids nuclei and particles*, translation of RIBEIRO et al. Rio De Janeiro: Campus, 1994, p. 53).
Figure 4A:
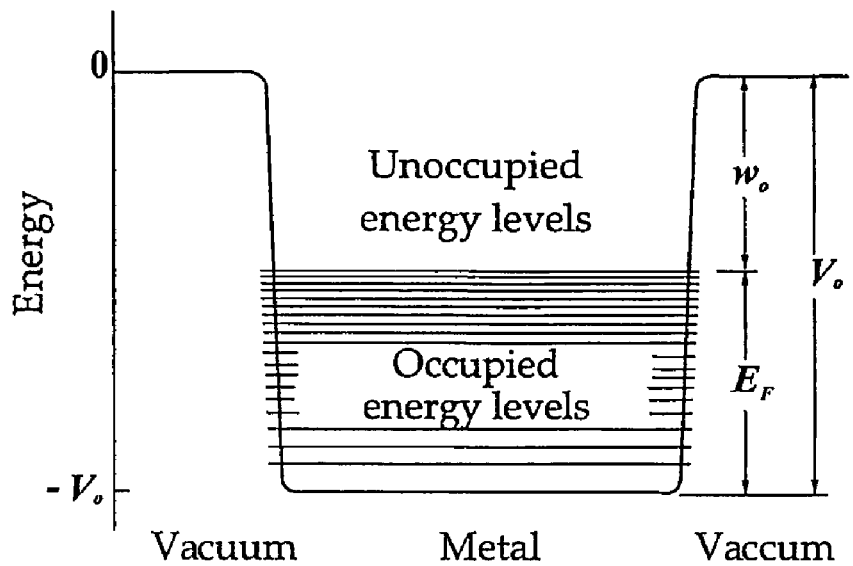
FIG. 4A represents the conduction electron average potential energy in a metal free of mechanical stress, from EISBERG et al (*Física Quântica—Quantun physic of atoms, molecules, solids nuclei and particles*, translation of RIBEIRO et al. Rio De Janeiro: Campus, 1994, p. 518).
Figure 4B:
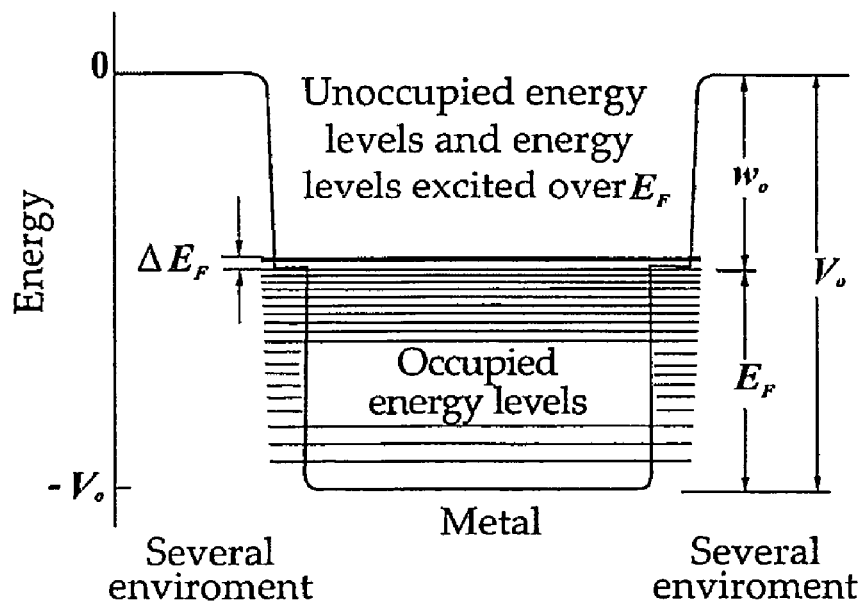
FIG. 4B represents the conduction electron average potential energy in a metal excited by mechanical stress.
Figure 5:
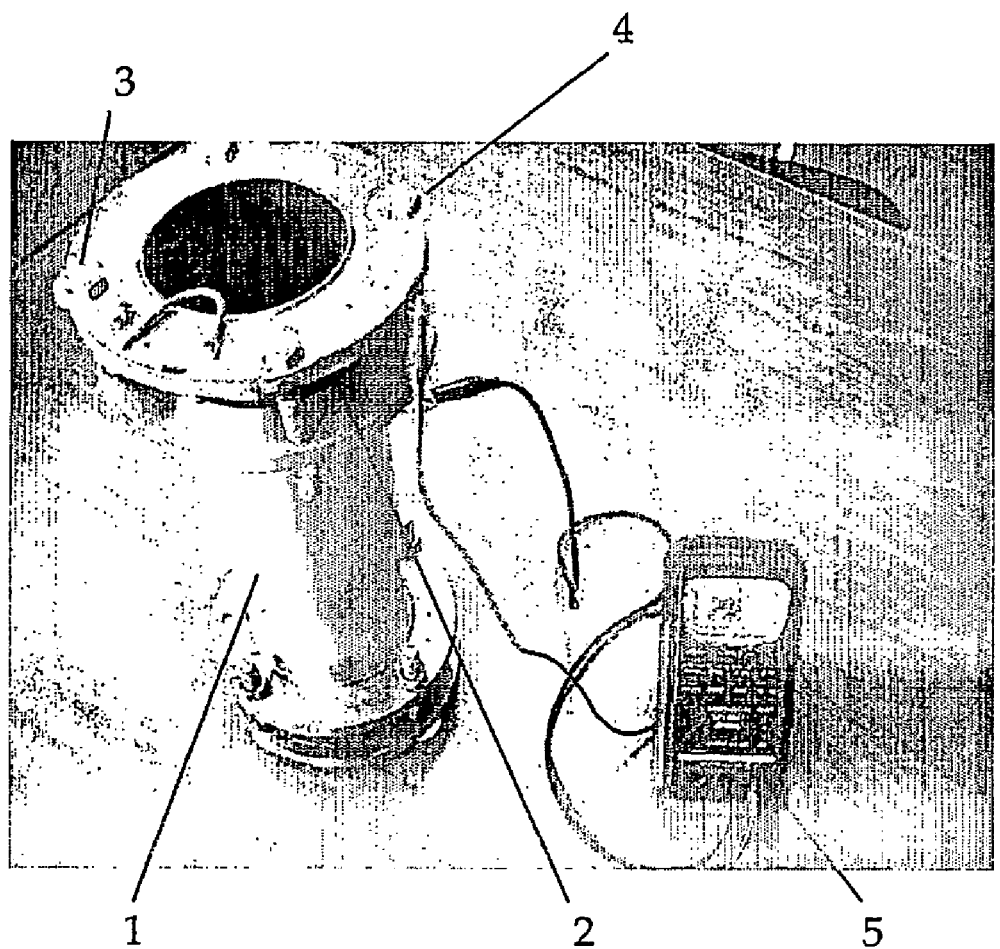
FIG. 5 represents the first-mode quantum generator indicating its components: bolts and nuts, external metallic shell, internal metallic shell and insulators; with a digital multimeter to check the transference of radiant energy.

The first-mode quantum generator shown on FIG. 5 is constituted by external metallic shell (1), internal metallic shell (2), bolts and nuts (3), dielectrics or insulators (4) and a digital multimeter (5) used as a standard of measurement to check the permanent transference of radiant energy The metallic shells (1) and (2) have high diameter-to-thickness ratio (D/t) associated with adequate relation between the yield strength and the modulus of elasticity of the metal ($\sigma_y/E$).

The bolts and nuts (3) place the external metallic shell (1) into tension and the internal metallic shell (2) into compression. Between the bolts and nuts (3) and the metallic shell (2) are the dielectrics (4) in order to insulate both shells. The radiant energy voltage generated is checked by the digital multimeter (5).

In the device shown as FIG. 5, the metallic materials (1), (2) and (3) have the same chemical composition. Further tests verified that it is also possible to achieve the desired industrialization with different chemical compositions of the components (1), (2) and (3). The mechanical design can vary depending on the application, but for practicality, the result is better obtained using compressed shells joined to tensioned bars linked by a pair of isolators at both extremities.

Thus, the first-mode quantum generator is an elementary form with an innovative constructive concept to allow easy industrialization. This construction has very low power availability generated by the electromotive force of the metal (or metals) used, due to the small area and the small ratio reached between the area of the metallic surface and the metal mass.

The second-mode quantum generator was developed to obtain an energy upgrade when compared to the first-mode quantum generator. FIGS. 6A, 6B, 6C and 6D illustrate it in a non-restrictive form in terms of variations allowed in accordance with the subject patent. It shows a practical way to implement the technology in an arrangement which achieves the essential characteristics of the second-mode quantum generator with higher power and less metal mass, at the same space with the minor number of plates by cells (10) and (11), following the procedures described below.

Firstly, the technology was chosen to achieve the higher ratio between the surface area and the mass of the metal of the free electron reservoir in a given space through the use of the porous lead plates (6) and (7) composed of micro-particles of pure metal formed by well known techniques of the background art used in the construction of lead acid batteries. The technology shown here may be improved through the use of thinner plates and smaller particles in order to obtain even higher ratios between the metallic surface areas and the mass of the metal of the free electron reservoir to increase the efficiency of energy generation.

Besides that, the cell (10) and cell (11) should be internally coated by pure porous lead or have one pure porous lead plate without metallic joints.

Secondly, the physical arrangement of the porous lead plates (6) and (7) in relation to the lead dioxide plates (8) and (9) inside of the cell (10) and cell (11) internally coated by pure porous lead or having one pure porous lead without metallic joints, makes possible to control the excitement of free electrons in the porous lead plates (6) and (7) by means of the compression state created by electromotive force from source (12) and the tension state created by discharge through electrical resistors (13) as illustrated.

The source (12), as well as the resistor (13), actuate inside the cell (10) and cell (11) sometimes in the same step and sometimes in different steps with respect to the two lead plates (6) e (7) as well as to the two lead dioxide plates (8) and (9), as illustrated on FIGS. 6A, 6B, 6C e 6D, described as follows.

To start its operation the second-mode quantum generator should be totally charged, that is: the porous lead plates (6) and (7), the lead dioxide plates (8) and (9), as well as the porous lead coating of cells (10) and (11) all charged.

In the first step, shown on FIG. 6A, the source (12) compresses the porous lead plate (7), and the resistor (13) places the porous lead plate (6) under a tensioned state.

In the second step, shown on FIG. 6B, the porous lead plate (6), tensioned in the first step, is virtually emulated on the positive polarization in order to receive the electron gas flow from the porous lead plate (7), compressed in the first step, through the constructive interference of the polarization from cell (10). In the third step, shown on FIG. 6C, the source (12) compresses the porous lead plate (6) and the resistor (13) places the porous lead plate (7) under a tensioned state.

Figure 6D:
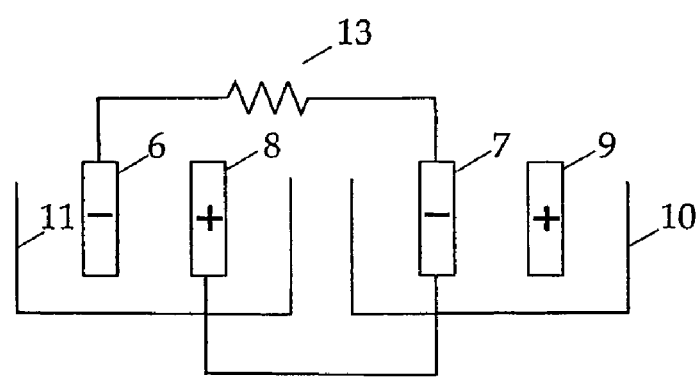

In the fourth step, shown on FIG. 6D, the porous lead plate (7), tensioned in the third step, is virtually emulated on the positive polarization in order to receive the electron gas flow from the porous lead plate (6), compressed in the third step, through the constructive interference of the polarization from cell (11).

This cyclic alternated process of recharge and discharge is controlled by dedicated software. The difference between the output power on the resistor (13) in the four steps and the input power of the source (12) in the first and third steps shows the generated energy. This generated energy at a given temperature is function of the composition and concentration of the electrolytes cells (10) and (11); the cells and plates geometry; the crystals or particles dimensions; the proprieties of the porous lead plates (6) and (7) and those of lead dioxide (8) and (9); as well as the activation time of each of the four steps. Each step has preferentially the interval of time of one quarter of the whole cycle period. Each step period depends on the projected surface areas of the porous lead of the plates (6) and (7) as well as the porous lead coatings from cells (10) and (11).

Direct current is obtained in the input and in the output of the system with the use of a greater number of porous lead plates and lead dioxide plates, for instance, twice as presented on FIGS. 6A, 6B, 6C e 6D where the output current is greater than the input current.

Thirdly, as shown on FIGS. 6A, 6B, 6C e 6D, in the second and fourth steps (FIGS. 6B and 6D) the system generates energy by the interaction of light and material operating as a quantum capacitor; and in the first and third steps (FIGS. 6A and 6C) operating as an accumulator; therefore, regarding this aspect, it is a new resultant product from patent BR PI9705871-8.

In their turn, the radiant recharger for accumulators and the radiant recharging process for accumulators, present symmetrical array to the second-mode quantum generator as showed on FIGS. 7A, 7B, 7C e 7D illustrating in a non-restrictive way a preferred embodiment.

Firstly, two batteries represented on FIGS. 7A, 7B, 7C e 7D, with the less number of porous lead plates (14) and (15) and dioxide lead plates (16) and (17) by cell (18) and (19), that should be internally coated by pure lead or have one pure porous lead plate without metallic link. They show in a practical way the change-over of the source (20) and the reverse polarized source (21), and the technology to obtain the maximum efficiency on the radiant recharge in two accumulators that have, each one, one positive pole and two negative poles, with the less metal mass in the same space. Like the second-mode quantum generator, the radiant recharger uses the technology to obtain higher ratios between the metallic surface areas and the mass of the metal of the free electron reservoir in a determinate space, through the use of porous lead plates (14) and (15) composed by pure metal micro-crystals.

The technology shown here may be improved through the use of thinner plates and smaller crystals in order to obtain even higher ratios between the metallic surface areas and the mass of the metal of the free electron reservoir, to increase the efficiency of the radiant recharger for accumulators.

Secondly, the physical arrangement of the porous lead plates (14) and (15) in relation to the lead dioxide plates (16) and (17) inside of the cells (18) and (19), to make possible the bi-oriented excitement of free electrons in the porous lead plates (14) and (15) by means of the compression state created by electromotive force from source (20) and the tension state created by discharge through the reverse polarization source (21).

The source (20), as well as the reverse polarization source (21), actuate inside the cells (18) and (19) sometimes in the same step, sometimes in different steps with respect to the two porous lead plates (14) e (15) as well as to the two lead dioxide plates (16) e (17), as illustrated on FIGS. 7A, 7B, 7C e 7D, and described as follows.

In the first step, shown on FIG. 7A, the source (20) compress the porous lead plate (15) and the reverse polarization source (21) places the porous lead plate (14) under a tension state.

In the second step, shown on FIG. 7B, the porous lead plate (15), with the active mass compressed in the first step, is virtually emulated on the positive polarization in order to transmit its electron gas flow to the porous lead plate (14), tensioned in the first step, through the constructive interference of the polarization from cell (19) and the source (20).

In the third step, shown on FIG. 7C, the source (20) compress the lead porous plate (14) and the reverse polarization source (21) places the porous lead plate (15) under a tension state.

Figure 7D:
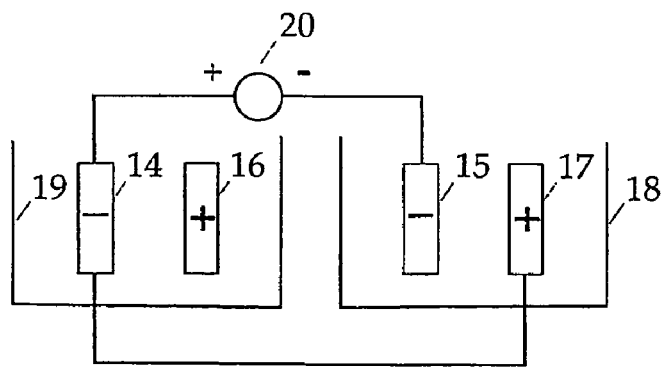

In the fourth step, shown on FIG. 7D, the lead porous plate (14), with the active mass compressed in the third step, is virtually emulated on the positive polarization in order to transmit its electron gas flow to the porous lead plate (15), tensioned in the third step, through constructive interference of the polarization from cell (18) and the source (20).

This cyclic alternated process of recharge and discharge made by the radiant recharger for accumulators, in order to recharge the plates from the second-mode quantum generators or even plates of conventional batteries during the manufacturing process in a more efficient way is controlled by dedicated software.

The difference between the recharge charge of the source (20) in the four steps and the discharge charge of the reverse polarization source (21) in first and third steps shows the high efficiency recharge. This recharge at a given temperature is function of composition and concentration of the electrolytes cells (18) and (19); the cells and plates geometry; the crystals or particles dimensions; the proprieties of the porous lead plates (14) and (15) and those of lead dioxide (16) and (17); as well as the activation time of each of the four steps. Each step has preferentially the interval of time of one quarter of the whole cycle period. Each step period depends on the projected surface area of the porous lead of the plates (14) and (15) as well as the porous lead coating from cells (18) and (19).

Direct current is obtained in the input and in the output of the system with the use of a greater number of porous lead plates and lead dioxide plates, for instance, twice as presented on FIGS. 7A, 7B, 7C e 7D where the output current is greater than the input current.

Thirdly as shown on FIGS. 7A, 7B, 7C e 7D, in the second and fourth steps (FIGS. 7B and 7D) the system generates energy operating as a quantum capacitor, transferring fifty percent of the distributed charge projected area of the compressed porous lead plate (14) and (15) to the tensioned porous lead plate (15) and (14), and vice versa, to increase the radiant recharger for accumulators efficiency due to the interaction of light and material. In the first and third steps (FIGS. 7A and 7C) the system operates as an accumulator, therefore, regarding this aspect, it is a new resultant product from patent BR PI9705871-8.

In order to optimize the porous lead plates (14) and (15) for a greater efficiency of the metal of the electrodes in the second-mode quantum generator as well as in the radiant recharger for accumulators it is essential that the recharge electrical charge ($Q_R$) that could be loaded in the volume variation of the crystal lattice of the electrode active mass between the tensioned state in the end of the discharge pulse and the compressed state reached in the end of the recharge pulse be equal to the discharge electrical load ($Q_D$) distributed on the surface projected area of the porous lead plates (14) and (15). That means: $Q_D = AC_{AVe} = Q_R = \frac{1}{2}V\epsilon(1-2\nu)eC_E$, which calculation parameters will be defined later.

The process of radiant recharge for accumulators is also efficient for recharging conventional accumulators of two poles. Besides being distinct processes, both are based on the same inventive concept as follows.

In order to facilitate the comprehension of the waveforms of both processes, there are presented characteristics to be used to transform a second species conductor into a first species conductor in pulsed current.

Electrical current conductors are classified in good conductors and bad conductors (or insulators). Good conductors, or simply conductors, are comprehended by metals and by the Carbon (non metal) and are called metallic conductors or first species conductors. Bad conductors or insulators include the majority of the non-metal, organic and inorganic chemical composites. Therefore, the pure acids, bases and salts are bad current conductors. Some aqueous solutions of certain acids, bases and salts are called second species conductors or electrolyte conductors.

The essential difference between the two species of conductors is that only in the second species there is the transportation of all the atomic particles.

The metallic conductors or first species conductors comply with the Ohm Law. In order that second species conductors also comply with the Ohm Law for a greater efficiency on the charge transference, the present invention adopted the Wheatstone Bridge, as shown of FIG. 8, however, due to the invention nature with the peculiarity of using pulsed current, instead alternated current, to establish the best frequency band to transfer charge for the accumulator as well as to take charge out of the accumulator (26). With the audio frequency oscillator (22) set in the band from 1 kHz to 4 kHz the current orientation varies with enough quickness so that the polarization effects could be eliminated. The bridge-balanced point is indicated by the oscilloscope (23). The bridge medium-point voltage is filtered and processed in the amplifier (24) and feeds the oscilloscope (23) vertical plates. One portion of the bridge input signal feeds the horizontal plates through an adequate phase-displacement circuit (25). The balance is indicated by the closing of the ellipse seen on the oscilloscope (23) screen when the two-phase signals are adjusted.

So, based on the conductivity data it is possible to submit the second species conductors to the Ohm Law through pulsed current. This procedure allows one more application of this technology through the frequency adjustment, optimizing the energy needed for battery recharge with more efficiency. The waveforms of these additional process are shown on FIGS. 9A and 9B, besides FIGS. 7A, 7B, 7C and 7D already described.

FIG. 9A shows the wrapper of the battery electric current amplitude $I_B$ in function of the time t in the first process for radiant recharge for conventional accumulators, made by a unique recharging pulsed train in PWM applied in a sealed battery of 7 Ah and 12 Volts, with efficiency superior to ninety five percent, with temperature variation in all recharge periods lower than 10° C. In the highlighted detail there are shown the recharge pulses amplitude $i_R$ and the recharge pulse time $t_R$ at the audio frequency of 2.77 kHz preferentially close to the center of the band where the electrolyte transforms into ohmic conductor, as described. It is important to notice that this recharge process is made without any discharging pulse, making this process completely different from the others by making only compression and strain relief, without any element under tension.

FIG. 9B shows a typical waveform of the battery electrical current $I_B$ in function of the time t in the second process of radiant recharge for conventional accumulators with the recharge made in direct current followed by discharge pulses train in PWM.

In the recharge period are shown the recharge amplitude pulse in direct current $i_R$ and the recharge pulse time $t_R$. Due to the high value of the electrical charge distributed on the projected surface area of one porous lead plate of an accumulator, its discharge should be made through several discharge pulses of amplitude $i_D$ and discharge pulse time $t_D$, in PWM, preferentially in the band of 1 kHz to 4 kHz. At this frequency the electrolyte transforms into an ohmic conductor. The sum of all the discharge pulse times $t_D$ is the discharge cycle resultant time.

The cadence of the discharge pulses is determinate by the duration of the calculated recharge pulse and should attend the following requirements.

The transferred electrical charge on the recharge pulse should preferentially be equal to the total electrical charge that could be introduced on the volume variation of the lattice crystal of the lead micro-crystals from electrode active mass. This volume variation occurs between the tensioned state obtained in the end of the discharge pulse and the compressed state reached in the end of the recharge pulse.

The recharge pulses should preferentially be in constant voltage in order to enhance the battery plate's lifetime. The current is controlled by dedicated software for the dynamic determination of the recharge time; or this time could be adjusted for the greater recharge current present in the process.

As an illustrative example a porous lead plate with 0.120 m×0.140 m×0.002 m is chosen as the free electron reservoir. The electrical charges that defines this process are approximately: discharge charge $Q_D = AC_{AVe} = (3.36 \times 10^{-2})(9.5 \times 10^{18})(2)(1.60 \times 10^{-19}) = 102 \times 10^{-3}$ C; and recharge charge $Q_R = \frac{1}{2}V\epsilon(1-2\square)eC_E$ where ½ is the ratio between the electrical energy (or thermal energy) and the mechanical energy, since the electrical and thermal energy are equal.

| Description | Value |
| --- | --- |
| Volume of the plate active mass: | $V = 7.67 \times 10^{-6}$ m³ |
| Unit longitudinal strain | $\epsilon = \sigma_x/E = 7.3 \times 10^{-4}$ |
| Poisson's Ratio | $v = 0.42$ |
| Concentration of free electrons on crystals | $C_E = 6.59 \times 10^{28}$ m⁻³ |

$Q_R = \frac{1}{2}(7.67 \times 10^{-6})(7.3 \times 10^{-4})(1 - 2 \times 0.42)(6.59 \times 10^{28})(1.6 \times 10^{-19}) = 4.7$ C The discharge pulses that expand the lattice crystal, and the recharge pulses that in time displacement contracts the crystal lattice, adopted on the radiant recharge process for accumulators are established in function of two conditions, as follows.

The essential condition is the duration of the pulse, because in order to obtain resonance the electrolyte should transform into ohmic conductor, which means, in the frequency band from 1 kHz to 4 kHz.

The other condition is that the medium intensity of the current should preferentially be around a hundred percent of the discharge rate $C_1$ (battery discharge rate of 1 hour). In order to exemplify the parameters of FIG. 9B a plate of 14.5 Ah is chosen; admitting that this operation occurs in a point of the band where the electrolyte transforms into an ohmic conductor, for instance, at 1 kHz. So, on the discharge rate $C_1$, the medium current $i_M = 14.5$ A, $i_R = 14.5$ A and $t_D = \frac{1}{2}$ f=500×10⁻⁶ S.

The recharge and discharge pulse trains by cycle are defined by: (a) recharge: one direct current pulse with the amplitude of $i_R = 14.5$ A at recharge time of $t_R = Q_R/i_R = 4.7/14.5 = 324 \times 10^{-3}$ s; (b) discharge: with amplitude $i_D = 2 \times 14.5$ A = 29 A have a certain number $N_D$ of discharge pulses in each cycle according to: $N_D = Q_D/(t_D \times i_D) = 0.102/(500 \times 10^{-6} \times 29) = 7$ pulses.

The parameters for the recharge process are: the voltage and duration of the recharge pulse; and the amplitude and duration of the discharge pulse. They could be adjusted for a constant optimized value during the whole process or dynamically changed during the process through monitoring the recharge current or the temperature of the battery.

The recharge temperature of the battery is kept inside an adequate band by a slightly increase on the number of discharge pulses ($N_D$) with smaller amplitude ($i_D$). It could slightly reduce the total recharge time but really enhances the battery lifetime.

The disclosed radiant recharge process for accumulators allows significant greater recharging currents; low recharge voltage, high energetic efficiency and low battery temperature when compared with the conventional slow recharge process. The efficiency is greater in the beginning of the process when the battery level is lower offering more activated material to react, increasing the statistic chance of the reaction occurs. Thus, the radiant recharge process for accumulators allows a fast recharge in a battery with great advantageous effects when compared with the traditional slow recharge process.

Lastly, the third-mode quantum generator, constituted by the integration of the second-mode quantum generator and the radiant recharger for accumulators, allowing the bi-orientation of the free electron gas of metals, which constitute a limitless supply of energy, with high efficiency and efficacy during the four steps of the cycle.

In order to facilitate further understanding of the mechanisms adopted by the third-mode quantum generator the following description is used to illustrate, in a non-restrictive way a preferred embodiment.

Firstly, two batteries represented on FIGS. 10A, 10B, 10C e 10D, with the less number of porous lead plates (27), (28), (29) and (30) and lead dioxide plates (31), (32), (33) and (34) inside two cells (35) and (36), that shows in a practical way the change-over between the resistor (37) and the source (38). It also demonstrates the technology to obtain two accumulators integrated in the same cell, being one at cell (35) and the other on cell (36), having each of these integrated accumulators preferentially six poles, being two positive poles and four negative poles.

The first elementary accumulator is represented by the porous lead plate (27) and by the lead dioxide plate (31); the second elementary accumulator is represented by the porous lead plate (28) and by the lead dioxide plate (32); the third elementary accumulator is represented by the porous lead plate (29) and by the lead dioxide plate (33); and the fourth elementary accumulator is represented by the porous lead plate (30) and by the lead dioxide plate (34). In this manner the cell (35) represents an integrated accumulator with six poles, being two positive and four negative constituted by the first and second elementary accumulators. In the same way the cell (36) also represents an integrated accumulator with six poles, being two positive and four negative constituted by the third and fourth elementary accumulators.

Thus, it uses the technology of porous electrodes in order to obtain the higher ratios between the metallic surface area and the mass of the metal of the free electron reservoir in a determinate space, through the use of porous lead plates (27), (28), (29) and (30) composed by pure metal micro-crystals. The technology shown here may be improved through the use of thinner plates and smaller crystals to obtain even higher ratios between the metallic surface areas and the mass of the metal of the free electron reservoir to increase the efficiency of the third-mode quantum generator.

Secondly, the circuits arrangements between the porous lead plates (27), (28), (29) and (30) and the lead dioxide plates (31), (32), (33) e (34) inside of the cells (35) and (36), to make possible the bi-oriented excitement of free electrons in the porous lead plates (27) and (28) in the cell (35) integrated with the oriented excitation of the porous lead plates (29) and (30) in the cell (36) by means of the compression state created by electromotive force from source (38) and the tension state created by the discharge of resistor (37)

The source (38) and the resistor (37) operate in cells (35) and (36), in different poles of the porous lead plates (27), (28), (29) and (30) as well as the poles of the lead dioxide plates (31), (32), (33) and (34) in the same cycle as illustrated on FIGS. 10A, 10B, 10C e 10D as described as follows.

In the first step, expressed on FIG. 10A, the porous lead plate (27) is emulated on the positive polarization through the lead dioxide plate (34) for the transference of the electron gas with the porous lead plate (30); as well as the porous lead plate (28) is emulated on the positive polarization through the lead dioxide plate (33) for the transference of the electron gas with the porous lead plate (29); with the connections of the cell (36), resistor (37) and source (38), transferring charges between the quantum capacitors of cells (35) and (36) and in the quantum capacitor of cell (36).

In the second step, expressed on FIG. 10B, the porous lead plate (30) is emulated on the positive polarization through the lead dioxide plate (32) for the transference of the electron gas with the porous lead plate (28); as well as the porous lead plate (29) is emulated on the positive polarization through the lead dioxide plate (31) for the transference of the electron gas with the porous lead plate (27) with the connections of the cell (35), resistor (37) and source (38), transferring charges between the quantum capacitors of cells (35) and (36) and in the quantum capacitor of cell (35).

In the third step, expressed on FIG. 10C, the porous lead plate (28) is emulated on the positive polarization through the lead dioxide plate (33) for the transference of the electron gas with the porous lead plate (29); as well as the porous lead plate (27) is emulated on the positive polarization through the lead dioxide plate (34) for the transference of the electron gas with the porous lead plate (30) with the connections of the cell (36), resistor (37) and source (38), transferring charges between the quantum capacitors of cells (35) and (36) and in the quantum capacitor of cell (36).

Figure 10D:
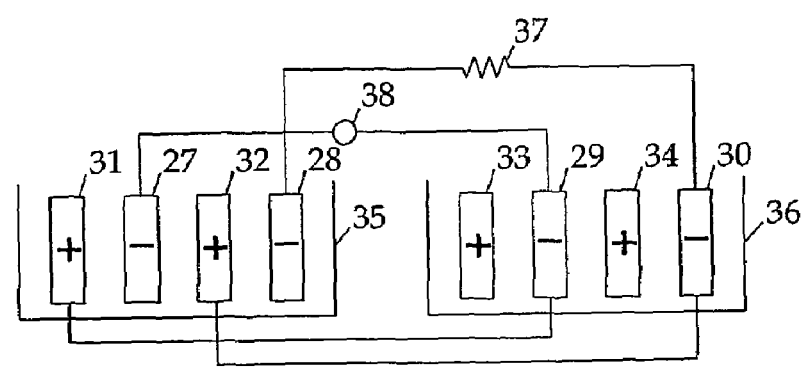

In the fourth step, expressed on FIG. 10D, the porous lead plate (29) is emulated on the positive polarization through the lead dioxide plate (31) for the transference of the electron gas with the porous lead plate (27); as well as the porous lead plate (30) is emulated on the positive polarization through the lead dioxide plate (32) for the transference of the electron gas with the porous lead plate (28) with the connections of the cell (35), resistor (37) and source (38), transferring charges between the quantum capacitors of cells (35) and (36) and in the quantum capacitor of cell (35).

This cyclic alternated process of recharge and discharge is controlled by dedicated software. The difference between the output power on the resistor (37) in the four steps and the input power of source (38) in the four steps shows the energy generation. This energy generation at a given temperature is function of the concentration of the electrolytes of the cells (35) and (36); the cells and plates geometry; the crystals or particles dimensions; the proprieties of the porous lead plates (27), (28), (29) and (30) and those of lead dioxide (31), (32), (33) and (34) as well as the activation timing of each of the four steps. Each step has preferentially the interval of time of one quarter of the whole cycle period; depending in a direct way of the projected surface area and the porous active mass of the negative plates.

Thirdly, it is important to observe that despite being an accumulator as shown on FIGS. 10A, 10B, 10C e 10D, in all the steps the system operates like a quantum capacitor due to the interaction of light and material. So, regarding this aspect it is a new resultant product from patent BR PI 9705871-8.

Fourthly, as the fraction of excited electrons with levels of energy slightly above and below Fermi Energy is given by the pure metal unit longitudinal strain $\epsilon = 9kT/32\ E_F$, as disclosed in this patent, the energetic availability of the third-mode quantum generator is directly related to the average temperature, that means, the operation temperature of the generator. Thus, the third-mode quantum generator also operates in lower or greater temperatures than the one illustrated in this report, with less or more energetic availability.

The Quantum Generator and Accessories "entails by transferring charges among the plates of the accumulators and or capacitors, through pulses that stimulate radiation that interacts with matter generating energy through a process mainly photoelectric" as described in part on U.S. Pat. No. 6,294,893, so in this aspect generally connected and adjusted in a metal that technically facilitates obtaining: the larger area-to-mass ratios; low yield point; as well as adequate relation between the yield point and the modulus of elasticity; and developed in this patent by means of new resultant products: first-mode quantum generator, second-mode quantum generator, third-mode quantum generator, radiant recharger for accumulators and as well as the radiant recharging process for accumulators. Therefore, they are new resultants products of the invention patent "Radiant System in Accumulators and Resultant Products" issued in various countries South Africa (# 98/4460), Lebanon (# 5963), Taiwan-Peoples Republic of China (# 87108743), Brazil (#97058871-8), Malaysia (PI # 9802329), Great Britain (GB # 2337165), United States (U.S. Pat. No. 6,294,893), etc.

9. INDUSTRIAL APPLICABILITY

The Quantum Generator and Accessories can be reproduced in a non-restrictive way, by the existing industry of accumulators, no-break power supply and electrical power sources or any related products.

The Quantum Generator and Accessories can be industrially applicated like electrical energy sources, operating like a central unit to supply energy for the switchboard of a whole building. The concept of Home Energy Systems (HES) can be attended, by means of portable individual energy generator.

The Quantum Generator and Accessories can be also embedded in equipments such as personal computers, telephone centrals, emergency equipment, electronic and electrical equipment transforming them into wireless and rechargeless devices.

In the same way, cell phones, notebooks, and other wireless equipment will have the solution for the inconvenient reduced lifetime of the existing batteries, by the appropriate mode of the Quantum Generator and Accessories.

The industrial applicability is vast: telecommunication, energy, lighting, automotive, aeronautical, spatial, defense and medical industries, etc., will be attended by the appropriate mode of the Quantum Generator and Accessories.

The invention claimed is:

1. A quantum generator device, comprising:
   first and second negative porous lead plates and third and fourth positive porous lead dioxide plates, the first, second, third, and fourth plates being composed of microparticles or particles having smaller than micro-particle dimensions, having a high area-to-mass ratio, and being immersed in a doped acid solution;
   wherein the first plate and the third plate are arranged in a first battery and the second plate and the fourth plate are arranged in a second battery;
   wherein the quantum generator device has a first configuration in which the first plate is placed into a compressed state by a first source and the third plate is placed into a tensioned state by a resistor, wherein the quantum generator device has a second configuration in which the first plate is placed into the tensioned state by the resistor and the third plate is placed into the compressed state by the first source, and wherein the quantum generator device alternates between the first configuration and the second configuration.

* * * * *